June 7, 1927. 1,631,145
J. F. NEWMAN
METHOD OF MAKING A RICE PRODUCT
Filed Oct. 28, 1925
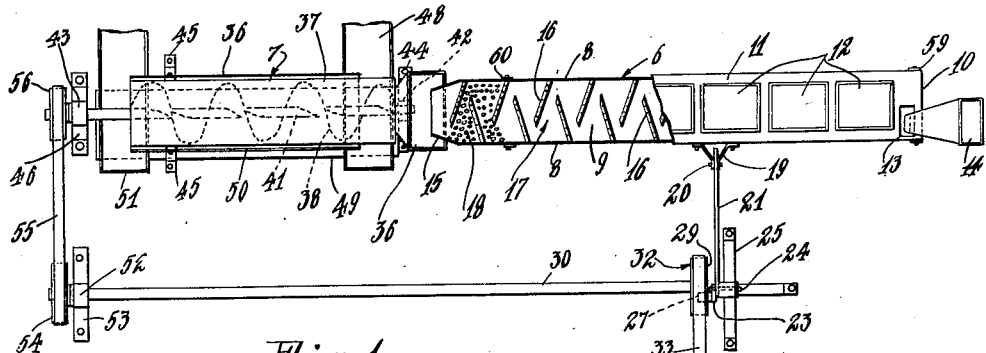
Fig.1.
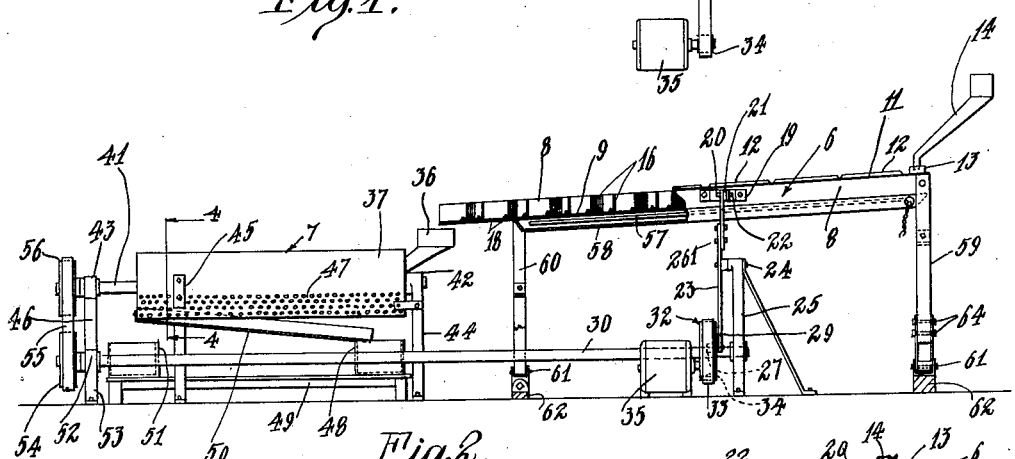
Fig.2.
Fig.3.
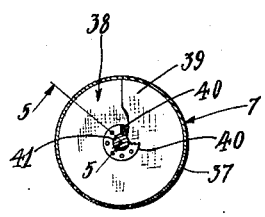
Fig.4.
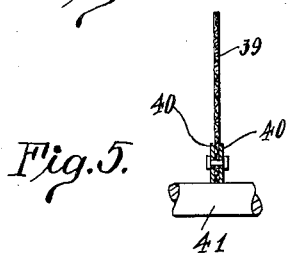
Fig.5.
Inventor
Jesse F. Newman.
By Lyon & Lyon
Attorneys Patented June 7, 1927.

1,631,145

UNITED STATES PATENT OFFICE.

JESSE F. NEWMAN, OF LOS ANGELES, CALIFORNIA.

METHOD OF MAKING A RICE PRODUCT.

Application filed October 28, 1925. Serial No. 65,330.

This invention relates to rice products. It also relates to the methods of and machines for making rice products.

An object of the invention is to produce from rice a new product.

Another object is to effect the commercial production of popped rice.

Another object is to provide a machine by which the various operations of making the rice product may be performed in a highly satisfactory manner.

Another object is to insure cleansing of the popped rice grains from the hulls that enclosed them prior to popping.

I have discovered that when heat is properly applied to unhulled rice, popping of the rice will occur. The percentage of the grains that are popped depends to some degree upon the character of the rice that is undergoing the treatment. I have discovered that sweet or gluten rice pops very successfully, there being comparatively few grains that do not pop. Therefore, in this specification the term "popping rice" defines unhulled rice grains that will pop when properly heated, and it is to be understood that the term "popping rice" excludes some of the rice of commerce. While the term "popping rice" is aptly applied to that variety of rice known to the trade as sweet or gluten rice, it is to be understood that it also applies to any other variety of rice that can be successfully popped.

The accompanying drawings illustrate a machine embodying the mechanical features of the invention, said machine being capable of performing the new method so as to produce the new rice product. The machine is to be considered as merely typical of those that could be employed for performing the new method.

Fig. 1 is a plan view of a machine embodying the invention, a portion of the popper cover being broken away to disclose the interior.

Fig. 2 is a front elevation of Fig. 1, a portion of one side of the popper being broken away to disclose the interior.

Fig. 3 is an end elevation of Fig. 2 from the right thereof.

Fig. 4 is an enlarged sectional elevation on the line indicated by 4—4, Fig. 2.

Fig. 5 is an enlarged sectional detail on the line indicated by 5—5, Fig. 4.

The machine illustrated in the drawings is constructed as follows: There is provided a popper 6 in which the rice is popped and partially freed of hulls, and a separator 7 which separates the popped rice grains from those hulls that discharge with the popped substance of the grains from the popper 6.

The popper 6 is constructed as follows: The popper casing comprises side walls 8, a bottom 9, an end wall 10 and a cover 11. In this instance the wall 8, bottom 9 and end wall 10 are constructed of sheet metal and the cover 11 is formed in part of sheet metal and in part of transparent members 12 of glass or the like, so that the popping operation within the casing can be observed by the attendant. The cover 11 at the feed end is provided with a feed opening 13, and projecting into the said opening is a feed spout 14 which may be connected with a hopper, not shown, or any other suitable container supplying the unhulled rice grains. The bottom 9 is aslant downward toward the discharge end.

The side walls 8 of the casing at the discharge end portion may extend aslant so as to reduce the width of the discharge end, as indicated at 15. Secured to the casing bottom 9 and projecting upwardly therefrom are transversely extending deflectors 16 in staggered relation and extending aslant toward the discharge end to form a tortuous passage 17 for the rice grains, thus prolonging the path of travel of the rice grains from end to end of the casing and causing the grains to be distributed substantially over the entire width of the casing floor during the operation of the popper. A portion of the casing floor 9 near the discharge end is perforated as indicated at 18.

The casing is oscillatively mounted, being set on standards 59, 60 positioned near the opposite ends of the casing. The standards 59, 60 are pivoted at 61 to supports 62. Preferably one of the standards, in this instance the standard 59, is adjustable in length for adjustment of the degree of slant of the casing. Therefore, the standard 59 is formed in relatively adjustable sections provided with a number of bolt holes 63, and bolts 64 are selectively positioned in said bolt holes to secure the desired adjustment.

Means are provided to oscillate or shake the casing sideways. These means may be of any suitable construction and, in this instance, are as follows: Projecting from one of the side walls 8 approximately midway of its length is a bracket 19 and pivoted at 20 to said bracket is a pitman 21 which, in turn, is pivoted at 22 to a lever 23 that is fulcrumed at 24 on a standard 25. The lever 23 may be formed in sections adjustably connected so that the throw of the pitman 21 can be regulated. To effect the relative adjustment of the lever sections, said sections are provided with a number of holes 26 and bolts 261 are selectively positioned in said holes. The lower end of the lever 23 is provided with a follower 27, a roller in this instance, which engages in the groove 28 of a cam 29. The cam 29 is mounted on a shaft 30 which turns in bearings 31 on the standard 25, and said shaft 30 is turned by the pulley 32. A belt 33 drives the pulley 32 and is operated by a pulley 34 on the shaft of the motor 35.

The popper 6 is provided with suitable heating means positioned, in this instance, beneath the bottom 9 of the casing. In the instance shown, the heating means comprises an electrical element or elements 57. These elements need not be described in detail herein as their construction is well understood by those versed in the electrical heating art. Preferably the heating elements 57 are enclosed, and for this reason there is provided a housing 58 which is suitably attached to the bottom 9 of the casing so that the heating elements are positioned between said bottom 9 and the bottom of the housing 58.

I have found that the desirable temperature of the air in the casing to be maintained is from 185° C. to 190° C. Also I have determined that the travel of the rice grains through the popper should occupy about 80 seconds more or less. The time of travel is governed by the degree of slant of the popper casing, the number and arrangement of the deflectors 16 and the rate of oscillation and throw of the casing. As before indicated, the rate of oscillation and throw may be changed by adjusting the lever members, and the rate of oscillation may be changed by changing the speed of the prime mover or changing the relative sizes of the various elements of the driving gear connecting the motor with the casing. The slant or pitch of the popper casing may be altered by relative adjustment between the sections of the standard 59.

The separator 7 is constructed as follows: There is provided a chute 36 having its mouth positioned beneath the discharge end of the casing, said chute being made of sufficient width so that the popped rice will discharge into said chute as the casing oscillates. The discharge end of the chute 36 is connected with and extends into a stationary drum 37, the bottom of which, in this instance, forms the trough of a screw conveyor, the blade of said conveyor being indicated at 38. The blade 38 is of special construction, being formed, at least in part, by material having a high coefficient of friction and such material is preferably more or less flexible. The flexible material I employ satisfactorily at present is canvas, and said canvas constitutes the outer or edge portion 39 of the blade. The portion 39 is secured between two helical clamping strips 40 constituting the metal portion of the blade 38. The strips 40 are secured to a shaft 41 positioned axially of the drum 37 and projecting from the discharge end of said drum. The shaft 41 turns in bearings 42, 43, the bearing 42 being supported by a standard 44 which also supports one end of the drum 37. The other end of the drum 37 is supported by a standard or standards 45. The bearing 43 is supported by a standard 46.

The shaft 41 is turned by any suitable means so as to cause the blade 38 to wipe the inner surface of the drum 7, so that rice grains discharging from the chute 36 into the drum 37 will be moved by the blade through the drum, and during such travel will be rubbed by the canvas blade portion 39, so as to rub, brush or pull off from the popped grains adhering hulls. The lower portion or bottom of the drum 39 is perforate from end to end as indicated at 47 so that the rice hulls will discharge from the drum through the perforations. The hulls discharge into a transversely extending conveyor 48 or other suitable receptacle extending beneath the drum 37 and supported by a suitable frame 49. An inclined table 50 extends beneath a portion of the drum 37 and connects with the conveyor 48 so as to carry to said conveyor the hulls that discharge from that portion of the drum 37 that does not extend over the conveyor.

Supported by the frame 49 is a transversely extending conveyor 51 or other suitable receptacle extending beneath the discharge end of the drum 37 for the purpose of receiving the popped grains of rice that have been freed from their hulls. It will be understood that the conveyors 48, 51 may be simply gravity conveyors or, if desired may be of the belt or other well known type for positive movement to any desired locations of the materials deposited thereon.

The shaft 41 may be driven by any suitable means and, in this instance, power to drive said shaft is derived from the prime mover 35 in the following manner. The shaft 30 extends lengthwise of the separator 7 and turns in a bearing 52 on a standard 53. The shaft 30 is provided with a pulley 54 connected by a belt 55 to a pulley 56 on the shaft 41.

In the machine described above, the newly invented method is performed as follows: Assuming that the prime mover 35 is operating, popping rice will be discharged into the popper 8 through the chute 14 and, owing to the tilt of the popper casing downwardly toward the discharge end thereof and to shaking or oscillation of the popper casing, the rice grains will be caused to travel toward the discharge end over the heated floor 9 and, after said grains have acquired the proper temperature, for example, from 185° C. to 190° C., popping of said grains will occur. The substance of each rice grain, upon popping, becomes an irregular white mass that can be eaten as a breakfast food, made into a confection or used in any other desired manner. Some of the hulls may become detached and drop through the perforations 18. Any grains remaining unpopped may also pass through the perforations 18.

The popped rice kernels, together with any hulls that may adhere thereto and any grains that have not popped and that have failed to pass through the perforations 18, will discharge into the drum 37 and will be moved along the drum by the conveyor blade. This blade functions to rub off any adhering hulls so that said hulls, together with the unpopped grains that have been discharged into the drum, will discharge through the perforations 47 and fall, either on to the table 50 and slide thence into the conveyor 48, or directly into the said conveyor. The cleaned product on reaching the discharge end of the drum will fall into the conveyor 51.

It will be readily understood that the product described above is quite different from pop corn, since pop corn, besides being a grain of a different substance, contains the hard outer shell of the grain whereas the popped rice is soft and fluffy and free from the hulls.

The steam generated within the rice kernels from the natural moisture contained in them causes the hulls to burst open and release therefrom the kernels which themselves are expanded to many times their natural size by expansion of the steam within them.

The perforations 18 and 47 are approximately $\frac{3}{16}$ of an inch in diameter to obtain the desired results in separating the popped grains from the unpopped grains and hulls. This size of perforation permits the hulls to pass through and, the popped kernels being larger, will not pass.

I claim:

1. The method of making a rice product consisting in heating unhulled popping rice having no more than its natural water content to a temperature sufficient to cause the steam generated within the hulls of the rice to burst open the hulls.

2. The method of making a rice product consisting in heating unhulled popping rice having no more than its natural water content to a temperature of approximately 185° C. to 190° C.

3. The method of making a rice product consisting in heating unhulled popping rice having no more than its natural water content to a temperature of approximately 185° C. to 190° C. for approximately eighty seconds.

4. The method of making a rice product consisting in heating unhulled popping rice having no more than its natural water content to a temperature sufficient to cause the steam generated within the hulls of the rice to pop the rice kernels, and separating the popped kernels from the hulls.

5. The method of making a rice product consisting in heating unhulled popping rice having no more than its natural water content to a temperature sufficient to cause the steam generated within the hulls of the rice to pop the kernels, and applying friction to any of the hulls adherent to the popped kernels to detach said hulls.

Signed at Los Angeles, California, this 22d day of October, 1925.

JESSE F. NEWMAN.